United States Patent
Boisclair et al.

(10) Patent No.: US 6,276,089 B1
(45) Date of Patent: Aug. 21, 2001

(54) CHAMBER FOR AEROPONIC CULTURE

(76) Inventors: André Boisclair, 752, 10$^e$ Rang; Raynald Godon, 670, 10e Rang, both of St-Jean-de-Brébeuf P.Q. (CA), G6G 5R6

(*) Notice: Subject to any disclaimer, the term of this patent is extended or adjusted under 35 U.S.C. 154(b) by 0 days.

(21) Appl. No.: 09/448,591

(22) Filed: Nov. 24, 1999

(51) Int. Cl.$^7$ .................................................. A01G 31/00
(52) U.S. Cl. ............................... 47/62 A; 47/60; 47/62 C
(58) Field of Search .................. 47/62 A, 60, 59, 47/63, 62 R, 62 N, 82

(56) References Cited

U.S. PATENT DOCUMENTS

| | | | |
|---|---|---|---|
| 4,035,950 | * | 7/1977 | Anselm ........................ 47/59 |
| 4,059,922 | * | 11/1977 | DiGiacinto .................. 47/82 |
| 4,075,785 | * | 2/1978 | Jones .......................... 47/64 |
| 4,218,898 | * | 8/1980 | Boyen et al. .............. 68/12.26 |
| 4,313,278 | * | 2/1982 | Pointing et al. ............. 47/1.1 |
| 4,514,930 | | 5/1985 | Schorr et al. . |
| 4,704,818 | * | 11/1987 | Cameron ................... 47/62 C |
| 4,775,093 | | 10/1988 | Lin . |
| 4,869,019 | * | 9/1989 | Ehrlich ..................... 47/62 A |
| 4,965,962 | * | 10/1990 | Akagi ........................ 47/65 |
| 5,394,647 | | 3/1995 | Blackford, Jr. . |
| 6,021,602 | * | 2/2000 | Orsi ......................... 47/62 A |

* cited by examiner

Primary Examiner—Charles T. Jordan
Assistant Examiner—Judith A. Nelson
(74) Attorney, Agent, or Firm—Holland & Knight LLP

(57) ABSTRACT

A waterproof sheet is provided with fold lines to fold the sheet into a chamber for aeroponic and hydroponic culture. Additional waterproof sheets are provided with suitable fold lines for folding into stands for supporting the chamber in operative position. The sheets can be shipped in flat condition considerably decreasing the shipping expenses compared to voluminous prefabricated chambers and stands. The weight and the cost are also considerably diminished.

13 Claims, 3 Drawing Sheets

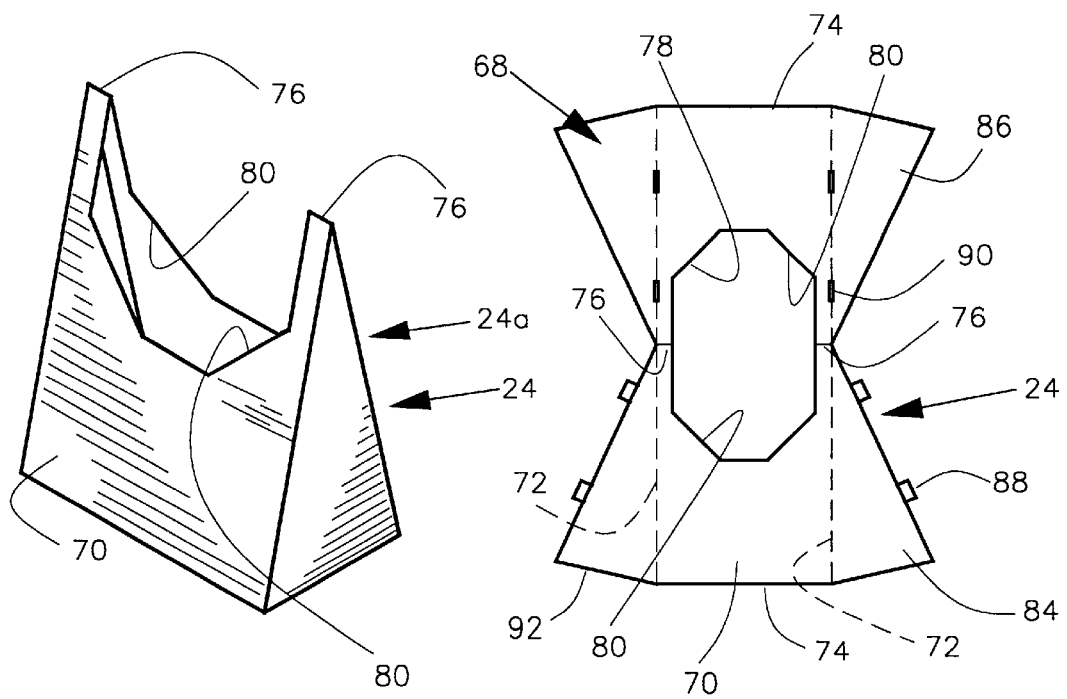
FIG.5
FIG.6
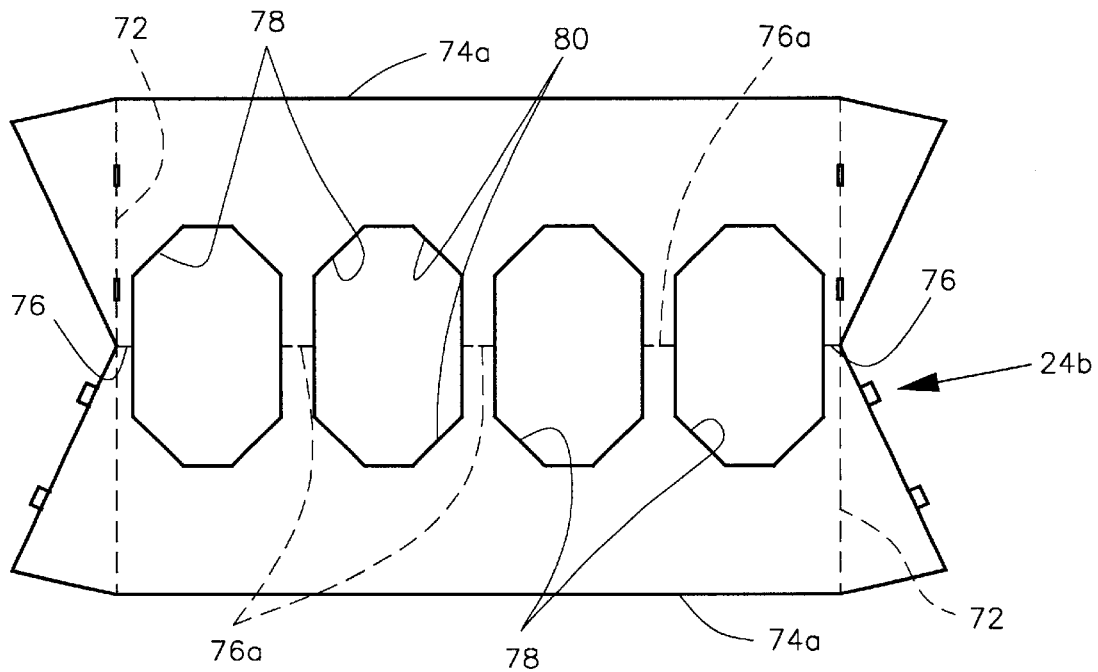
FIG.7

CHAMBER FOR AEROPONIC CULTURE

FIELD OF THE INVENTION

The present invention relates to chambers used for cultivating plants in aeroponic and hydroponic conditions.

BACKGROUND OF THE INVENTION

Studies have shown that plants the roots of which are exposed in aeroponic atmosphere give better results than plants the roots of which are immersed in a hydroponic environment. Known chambers used for cultivating plants in aeroponic conditions consist of heavy elongated boxes with parallel side walls, a V-shaped bottom wall and a cover perforated for plant insertion so that their roots are exposed within the box to be continuously sprayed by water jets in which suitable fertilizers and nutrients are dissolved. The water is discharged from the bottom of the chamber at one end and recirculated by a pump. The chambers should have an optimal depth of about fourteen inches for the majority of plants species. However, since these chambers are pretty bulky and heavy, the cost of manufacturing and shipping is too high, that is why chambers having a depth of only six inches are presently available on the market.

OBJECTS OF THE INVENTION

The general object of the present invention is to provide a chamber for aeroponic culture which obviates the above noted disadvantages.

A more specific object of the present invention is to provide a chamber of the character described which is made from a flat waterproof sheet with suitable fold lines so that the sheet can be folded into a chamber when necessary.

Another object of the present invention is to provide stands for the chambers also made of foldable waterproof flat sheets.

Another object of the present invention is to provide a chamber which can be made with an optimal depth and yet be made at a reasonable cost.

SUMMARY OF THE INVENTION

A chamber for aeroponic culture is formed of a single elongated moisture proof flat sheet capable of being folded for use and unfolded for storage with said sheet having spaced, parallel, longitudinally extending fold lines defining, when said sheet is folded in the same direction about said fold lines, two parallel side walls of the same width, a bottom portion composed of downwardly converging bottom walls joined along a ridge, a top cover depending from one side wall and a closure flap depending from the outer edge of said cover and adapted to overlap and be secured to the other side wall, said cover having spaced pre-cut openings for plant insertion with their roots exposed inside said chamber, said sheet further defining two pairs of end flaps depending from the respective ends of both side walls by fold lines normal to said first named fold lines, each end flap having a generally triangular extension directed towards the triangular extension of the other end flap of the pair, each pair of end flaps foldable in overlapping position to close the ends of said chamber.

Preferably, said cover further has pre-cut small holes for water inlet tubing insertion, said tubing carrying water to be sprayed onto said roots of said plants.

Preferably, there are two closely spaced fold lines forming the ridge of said downwardly converging bottom walls to define a flat bottom ridge therebetween.

Preferably, the apex portion of each of said triangular extensions of one pair of end flaps is cut out to form a water outlet.

Preferably, the chamber stands for supporting said chamber when erected, are each formed of a single, second sheet with first and second spaced, parallel, fold lines defining the longer sides of a central panel of rectangular shape, said panel having parallel free edges defining its shorter sides, said central panel having a third fold line transverse to said first and second fold lines and midway of said free edges of said central panel, the latter having a centered opening divided in two mirror image sections by said third fold line, each section of a shape to fit around said downwardly converging bottom walls and around said side walls when said central panel is folded in two portions about said third fold line to form an inverted V-shape stand, said second sheet further including a pair of flaps depending from each side of said central panel about said first and second fold lines on opposite sides of said third fold line and foldable and securable in overlapping position to position said two portions in said inverted V-shape.

Preferably, one stand has a smaller size than the size of the other stand so as to support the end of said chamber having said water outlet at a lower level than the other end of said chamber.

Alternatively, a plurality of chambers include chamber stands for supporting said chambers when erected and placed adjacent to each other, each chamber stand formed of a single second sheet with first and second spaced parallel score lines defining the shorter sides of a panel of rectangular shape, said central panel having parallel free edges defining its longer sides, said central panel having a third fold line transverse to said first and second fold lines and midway of said free edges of said central panel, the latter having a plurality of adjacent centered openings each divided in two mirror image sections by said third fold line, each section of a shape to fit around said downwardly converging bottom walls and around said side walls when said central panel is folded in two portions about said third fold line to form an inverted V-shape stand, said sheet further including a pair of flaps depending from each side of said central panel about said first and second fold lines on opposite sides of said third fold line and foldable and securable in overlapping position to position said two portions in inverted said V-shape.

BRIEF DESCRIPTION OF THE DRAWINGS

In the annexed drawings, like reference characters indicate like elements throughout.

FIG. 5 is a perspective view of one of the stands;

FIG. 6 is a view of the flat sheet pre-cut and pre-stamped with fold lines to form the stand of FIG. 5 when folded; and FIG. 7 is a view similar to FIG. 6 showing a second embodiment of a flat sheet pre-cut and pre-stamped with fold lines to form a stand for simultaneously supporting four adjacent chambers when folded.

DETAILED DESCRIPTION OF THE PREFERRED EMBODIMENT

Figure 1:
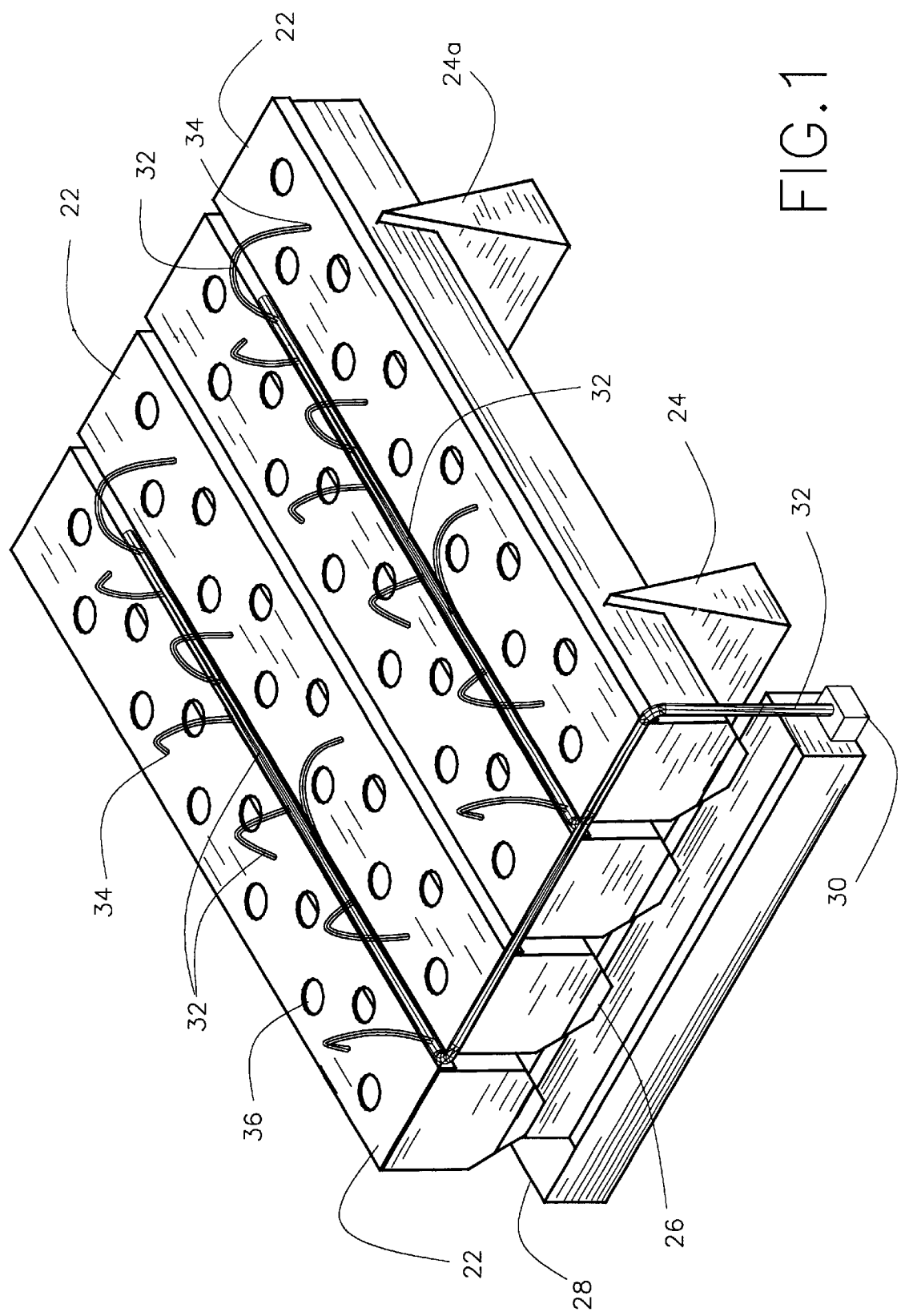
FIG. 1 is a perspective view of several chambers in accordance with an embodiment of the present invention in operative position for aeroponic plant cultivation.
Figure 2:
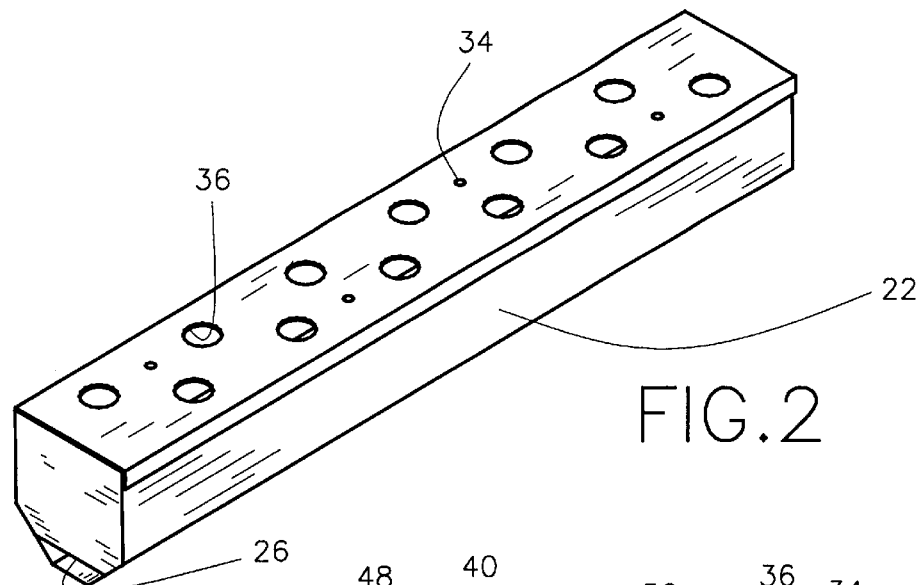
FIG. 2 is a perspective view of one chamber.
Figure 3:
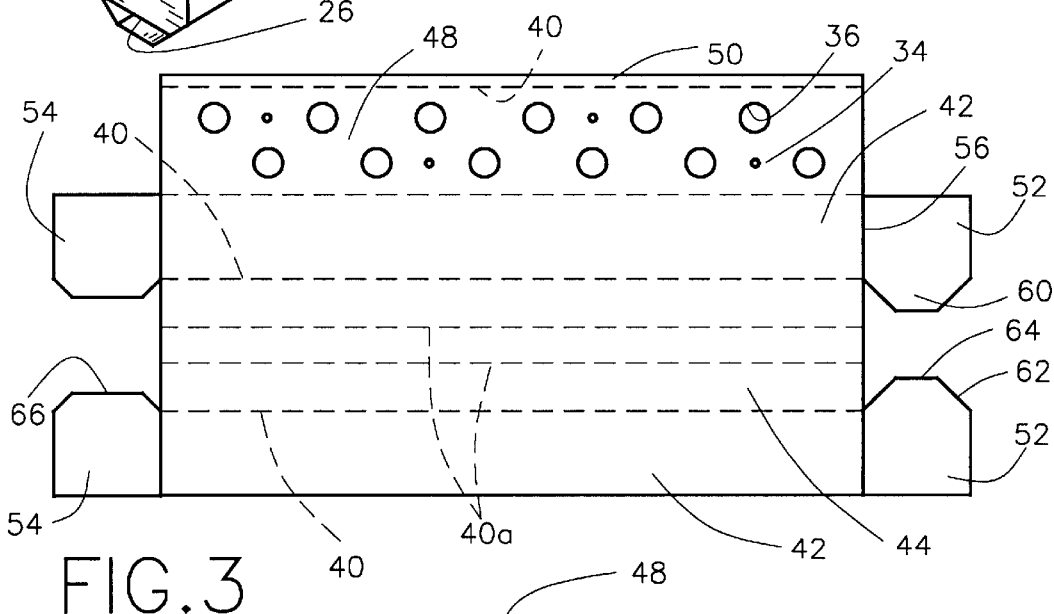
FIG. 3 is a plan view of a plastic flat sheet shaped and pre-stamped with fold lines to form the chamber of FIG. 2.

Referring to FIG. 1, there are shown four chambers 22 disposed side by side and each supported by a lower stand 24 and a higher stand 24a so that the chambers are slightly inclined towards one end which is provided with a water outlet 26.

These water outlets are disposed above a reservoir 28 common to the four chambers and provided at one end with a recirculating pump 30 for recirculating the water through a water tubing network 32 which enters the top chamber cover through small holes 34 to supply tubing nozzles connected thereto and disposed inside the chambers for spraying water onto the roots of plants inserted through cover openings 36.

In accordance with the invention, each chamber 22 is made of a waterproof flat sheet 38 preferably made of a thermoplastic namely a corrugated plastic sheet such as sold under the registered Trade Mark COROPLAST. This sheet is pre-cut to the desired shape and size and pre-stamped with suitably spaced fold lines.

More particularly, the sheet is of generally rectangular shape and is provided with six longitudinally extending, spaced, parallel fold lines 40, two of which are indicated at 40a. The fold lines 40 form side walls 42 of equal width, downwardly converging bottom walls 44 also of equal width, the walls 44 being joined to a flat ridge portion 46 by two closely spaced fold lines 40a. Therefore, the ridge 46 is flat.

Figure 4:
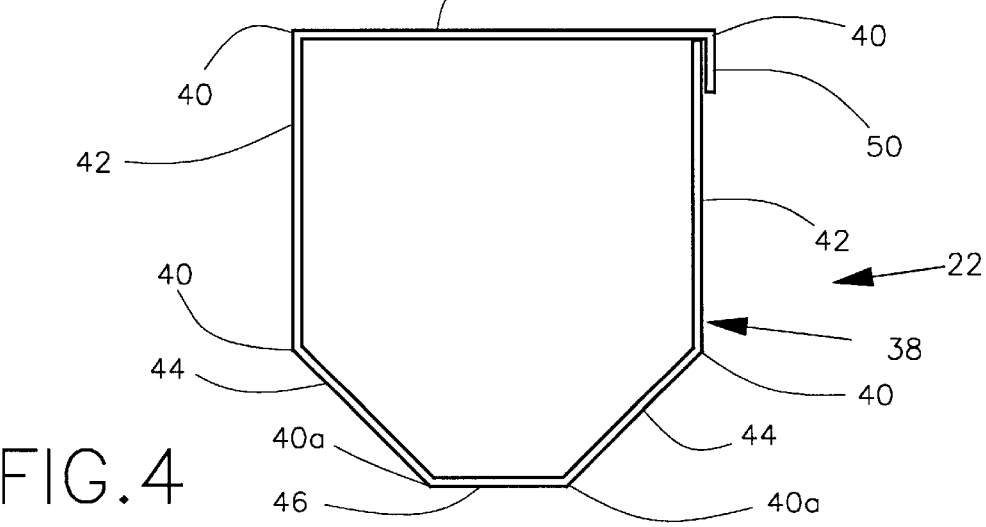
FIG. 4 is a cross-section of the chamber of FIG. 2.

Fold lines 40 further form a cover 48 with at its free end a closure flap 50, the cover depending from the top of one side wall and the closure flap 50 adapted to overlap and be secured to the top portion of the other side wall. Therefore, when the sheet is folded in the same direction, the cross-sectional shape of the chamber is obtained as shown in FIG. 4.

The plant insertion openings 36 and the smaller holes 34 for receiving the tubing 32 are made in the cover 48.

Pairs of end flaps 52 and 54 are respectively connected to the higher end and the lower end of the chamber 22 by fold lines 56 which are normal to the longitudinal 40 and 40a. Each end flap 52, 54 has a free edge 58 which is parallel to the fold lines 56. Each end flap has a triangular extension 60 with converging side edges 62, these triangular extensions extend towards each other for a given pair of end flaps 52 or 54. The apex edge 64 of end flaps 52 fit the flat ridge 46 of the chamber when the end flaps 52 are folded in overlapping position so that these end flaps 52 completely close the higher end of chamber 22. On the other hand, the apex edges 66 of end flaps 54 are cut-out to form the water outlet 26 when the end flaps 54 are folded in overlapping position. Otherwise, the end flaps 52 and 54 are of a shape to close the respective ends of the chamber 22.

Once the sheet 38 has been folded to form the chamber 22, the end flaps 52, 54 and the closure flap 50 may be adhered to in closed position by any fastener means, preferably a fastener means which is releasable, for instance a releasable pressure adhesive, so that the chamber can be unfolded in flat condition whenever required for minimum storage space.

Each stand 24 is also made of a flat sheet 68 which is pre-cut to the required shape and size and pre-stamped with suitable fold lines.

Sheet 68 defines a rectangular central panel 70 which is outlined by parallel longitudinal fold lines 72 and by free edges 74. A transverse fold line 76 extends midway of the central panel 70. This panel furthermore has a centered opening 78 which is divided in two mirror image sections 80 by the transverse fold line 76.

Triangular side flaps 84 and 86 depend from each side of the central panel 70 along the fold lines 72. Each triangular side flap 84 is provided at its outer inclined edge with tongues 88 and at its inner edge with slits 90 are made along the fold line 72. These slits 90 are designed to receive the tongues 88 when the flaps 84 are folded in overlapping position. These flaps have a bottom edge 92 which is inclined with respect to the free edges 74 of the central panel 70.

Sheet 68 is folded about the transverse fold line 76 to form a stand of inverted V-shape with the mirror image sections 80 opening upwardly and shaped to snugly receive the bottom walls 44, the flat ridge 46 and at least a portion of the side walls 42 of the erected chamber 22. The triangular side flaps 84 are folded in overlapping position and locked in this position by the tongues 88 inserted within the slits 90. The bottom edges 92 of the flaps 84 rest squarely on the stand supporting surface.

Each chamber 22 is supported by two stands 24 and 24a, stand 24a being of a size and shape to support the higher end of the chamber 22 so that the water flowing along the bottom of the chamber 22 will discharge at the water outlet 26.

Alternatively, each stand 24 and 24a are adapted to simultaneously support a plurality, preferably four, of chambers 22 placed adjacent to each other, as shown in FIG. 7. Referring to FIG. 7, this stand 24b is similar to stand 24 but has four adjacent openings 78, along the direction of the free edges 74a, which are divided in two mirror image sections 80 by the transverse fold lines 76 at the extremities of the center line and fold lines 76a inbetween two adjacent openings 78 also along the same center line.

What is claimed is:

1. A chamber for aeroponic culture formed of a single elongated moisture proof flat sheet capable of being folded for use and unfolded for storage with said sheet having spaced, parallel, longitudinally extending fold lines defining, when said sheet is folded in the same direction about said fold lines, two parallel side walls of the same width, a bottom portion composed of downwardly converging bottom walls joined along a ridge, a top cover depending from one side wall and a closure flap depending from the outer edge of said cover and adapted to overlap and be secured to the other side wall, said cover having spaced pre-cut openings for plant insertion with their roots exposed inside said chamber, said sheet further defining two pairs of end flaps depending from the respective ends of both side walls by fold lines normal to said first named fold lines, each end flap having a generally triangular extension directed towards the triangular extension of the other end flap of the pair, each pair of end flaps foldable in overlapping position to close the ends of said chamber.

2. A chamber as defined in claim 1, wherein said cover further has pre-cut small holes for water inlet tubing insertion, said tubing carrying water to be sprayed onto said roots of said plants.

3. A chamber as defined in claim 2, wherein there are two closely spaced fold lines forming the ridge of said downwardly converging bottom to define a flat bottom ridge therebetween.

4. A chamber as defined in claim 2, wherein the apex portion of each of said triangular extensions of one pair of end flaps is cut out to form a water outlet.

5. A chamber as defined in claim 3, wherein the apex portion of each of said triangular extensions of one pair of end flaps is cut out to form a water outlet.

6. A chamber as defined in claim 2, further including chamber stands for supporting said chamber when erected, each chamber stand formed of a single second sheet with first and second spaced parallel fold lines defining the longer sides of a central panel of rectangular shape, said central panel having parallel free edges defining its shorter sides, said central panel having a third fold line transverse to said first and second fold lines and midway of said free edges of said central panel, the latter having a centered opening divided in two mirror image sections by said third fold line, each section of a shape to fit around said downwardly converging bottom walls and around said side walls when said central panel is folded in two portions about said third fold line to form an inverted V-shape stand, said second sheet further including a pair of flaps depending from each side of said central panel about said first and second fold lines on opposite sides of said third fold line and foldable and securable in overlapping position to position said two portions in said inverted V-shape.

7. A chamber as defined in claim 6, wherein there are two stands per chamber, one stand having a smaller size than the size of the other stand so as to support the end of said chamber having said water outlet at a lower level than the other end of said chamber.

8. A chamber as defined in claim 3, further including chamber stands for supporting said chamber when erected, each chamber stand formed of a single second sheet with first and second spaced parallel score lines defining the longer sides of a panel of rectangular shape, said central panel having parallel free edges defining its shorter sides, said central panel having a third fold line transverse to said first and second fold lines and midway of said free edges of said central panel, the latter having a centered opening divided in two mirror image sections by said third fold line, each section of a shape to fit around said downwardly converging bottom walls and around said side walls when said central panel is folded in two portions about said third fold line to form an inverted V-shape stand, said sheet further including a pair of flaps depending from each side of said central panel about said first and second fold lines on opposite sides of said third fold line and foldable and securable in overlapping position to position said two portions in inverted said V-shape.

9. A chamber as defined in claim 8, wherein the apex portion of each of said triangular extensions of one pair of end flaps is cut out to form a water outlet.

10. A plurality of chambers as defined in claim 2, further including chamber stands for supporting said chambers when erected and placed adjacent to each other, each chamber stand formed of a single second sheet with first and second spaced parallel fold lines defining the shorter sides of a central panel of rectangular shape, said central panel having parallel free edges defining its longer sides, said central panel having a third fold line transverse to said first and second fold lines and midway of said free edges of said central panel, the latter having a plurality of adjacent centered openings each divided in two mirror image sections by said third fold line, each section of a shape to fit around said downwardly converging bottom walls and around said side walls when said central panel is folded in two portions about said third fold line to form an inverted V-shape stand, said second sheet further including a pair of flaps depending from each side of said central panel about said first and second fold lines on opposite sides of said third fold line and foldable and securable in overlapping position to position said two portions in said inverted V-shape.

11. Chambers as defined in claim 10, wherein there are two stands per all chambers, one stand having a smaller size than the size of the other stand so as to support the end of said chambers having said water outlet at a lower level than the other end of said chambers.

12. A plurality of chambers as defined in claim 3, further including chamber stands for supporting said chambers when erected and placed adjacent to each other, each chamber stand formed of a single second sheet with first and second spaced parallel score lines defining the shorter sides of a panel of rectangular shape, said central panel having parallel free edges defining its longer sides, said central panel having a third fold line transverse to said first and second fold lines and midway of said free edges of said central panel, the latter having a plurality of adjacent centered openings each divided in two mirror image sections by said third fold line, each section of a shape to fit around said downwardly converging bottom walls and around said side walls when said central panel is folded in two portions about said third fold line to form an inverted V-shape stand, said sheet further including a pair of flaps depending from each side of said central panel about said first and second fold lines on opposite sides of said third fold line and foldable and securable in overlapping position to position said two portions in inverted said V-shape.

13. Chambers as defined in claim 12, wherein the apex portion of each of said triangular extensions of one pair of end flaps of each chamber is cut out to form a water outlet.

* * * * *